(12) United States Patent
Fukushima

(10) Patent No.: US 7,195,111 B2
(45) Date of Patent: Mar. 27, 2007

(54) CLUTCH DEVICE HAVING A CLUTCH DAMPER AND DUAL-MASS FLYWHEEL ASSEMBLY

(75) Inventor: Hirotaka Fukushima, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/638,541

(22) Filed: Aug. 12, 2003

(65) Prior Publication Data

US 2004/0040815 A1    Mar. 4, 2004

(30) Foreign Application Priority Data

| Sep. 2, 2002 | (JP) | ............................. 2002-256567 |
| Sep. 2, 2002 | (JP) | ............................. 2002-256568 |
| Sep. 2, 2002 | (JP) | ............................. 2002-256569 |
| Nov. 26, 2002 | (JP) | ............................. 2002-342535 |

(51) Int. Cl.
   *F16F 15/30* (2006.01)
(52) U.S. Cl. ................ 192/70.17; 192/30 V; 192/214.1
(58) Field of Classification Search ............. 192/70.17, 192/30 V, 212, 214, 214.1, 107 R
See application file for complete search history.

(56) References Cited

U.S. PATENT DOCUMENTS

| 4,663,983 | A | * | 5/1987 | Kobayashi et al. ............ 74/574 |
| 4,751,993 | A | * | 6/1988 | Fukushima ............... 192/70.17 |
| 4,796,740 | A | * | 1/1989 | Fukushima ................ 192/30 V |
| 4,842,116 | A | * | 6/1989 | Fukushima ................ 192/214.1 |
| 4,844,225 | A | * | 7/1989 | Fukushima ............... 192/70.17 |
| 4,846,323 | A | * | 7/1989 | Fukushima ................ 192/30 V |
| 4,972,734 | A | * | 11/1990 | Hyodo et al. .................. 74/574 |
| 5,168,971 | A | * | 12/1992 | Kovac ....................... 192/30 V |
| 5,499,703 | A | * | 3/1996 | Kii et al. ................. 192/70.11 |
| 5,622,248 | A | * | 4/1997 | Villaverde et al. .......... 198/493 |
| 5,645,151 | A | * | 7/1997 | Lindner et al. ........... 192/70.17 |
| 5,826,689 | A | * | 10/1998 | Bochot .................... 192/70.17 |
| 5,979,623 | A | * | 11/1999 | Yamamoto ................ 192/30 V |
| 6,012,559 | A | * | 1/2000 | Yamamoto ................ 192/30 V |
| 6,401,897 | B1 | * | 6/2002 | Jackel et al. ............. 192/70.13 |
| 6,481,552 | B1 | * | 11/2002 | Fukushima .............. 192/70.17 |

FOREIGN PATENT DOCUMENTS

| DE | 3430457 C2 | 2/1986 |
| DE | 3505069 C1 | 2/1986 |
| DE | 3610735 A1 | 10/1986 |

(Continued)

*Primary Examiner*—Saul Rodriguez
(74) *Attorney, Agent, or Firm*—Global IP Counselors, LLP

(57) ABSTRACT

In a clutch device 1, a second flywheel assembly 5 is axially movable within a predetermined range relative to a crankshaft 2, and a flywheel 21 has a friction surface 21*a* on a side remote from an engine. The damper mechanism 6 elastically couples the flywheel 21 to the crankshaft 2. The clutch disk assembly 9 has a friction facing 54 neighboring the first friction surface 21*a*. The clutch cover assembly 8 is attached to the flywheel 21, and biases the friction facing 54 toward the first friction surface 21*a*. The release device 10 applies an axial load directed toward the engine to the clutch cover assembly 8, and thereby releases the load toward the friction facing 54. The relative rotation suppressing mechanism 24 couples the second flywheel assembly 5 to the disk-like member 13 when the clutch cover assembly 8 receives the axial load directed toward the engine.

16 Claims, 14 Drawing Sheets

FOREIGN PATENT DOCUMENTS

| | | |
|---|---|---|
| DE | 3610871 A1 | 11/1986 |
| DE | 3519912 C2 | 12/1986 |
| DE | 3545857 C1 | 2/1987 |
| DE | 3628773 C2 | 3/1987 |
| DE | 3629225 C2 | 3/1987 |
| DE | 3546503 C2 | 4/1987 |
| DE | 3642909 C2 | 6/1987 |
| DE | 3642877 C2 | 7/1987 |
| DE | 3607116 A1 | 9/1987 |
| DE | 3607751 C2 | 9/1987 |
| DE | 3703123 C2 | 9/1987 |
| DE | 3609149 C2 | 10/1987 |
| DE | 3706883 C2 | 10/1987 |
| DE | 8421968 U1 | 3/1988 |
| DE | 4420927 A1 | 12/1994 |
| DE | 19721236 A1 | 12/1997 |
| DE | 19709343 A1 | 9/1998 |
| JP | 60-116941 A | 6/1985 |
| JP | 60-191745 U | 12/1985 |
| JP | 60-23546 U | 2/1986 |
| JP | 62-062023 A | 3/1987 |
| JP | 02-031024 A | 2/1990 |
| JP | 02-136840 U | 11/1990 |
| JP | 03-149434 A | 6/1991 |
| JP | 04-058642 U | 5/1992 |
| JP | 06-129444 A | 5/1994 |
| JP | 07-259879 A | 10/1995 |
| JP | 08-061432 A | 3/1996 |
| JP | 09-004680 A | 1/1997 |
| JP | 10-238591 A | 9/1998 |
| JP | 2000-283176 A | 10/2000 |
| JP | 2001 140928 * | 5/2001 |
| JP | 2004-176789 A | 6/2004 |

* cited by examiner

CLUTCH DEVICE HAVING A CLUTCH DAMPER AND DUAL-MASS FLYWHEEL ASSEMBLY

BACKGROUND OF THE INVENTION

1. Field of the Invention

The invention relates to a clutch device having a flywheel. More specifically, the present invention relates to a clutch device, in which the flywheel has a friction surface to facilitate clutch coupling to a frictional coupling portion of a clutch disk assembly. The present invention also relates to a frictional resistance generating mechanism generating a hysteresis torque for damping torsional vibrations.

2. Background Information

Conventionally, a flywheel is attached to a crankshaft of an engine for absorbing vibrations caused by variations in engine combustion. Further, a clutch device is arranged on a transmission side (i.e., in a position axially shifted toward the transmission) with respect to the flywheel. The clutch device usually includes a clutch disk assembly coupled to an input shaft of the transmission and a clutch cover assembly for biasing the frictional coupling portion of the clutch disk assembly toward the flywheel. The clutch disk assembly typically has a damper mechanism for absorbing and damping torsional vibrations. The damper mechanism has elastic members such as coil springs arranged for compression in a rotating direction.

A structure is also known in which the damper mechanism is not arranged in the clutch disk assembly, and rather is arranged between the flywheel and the crankshaft. In this structure, the flywheel is located on the output side of a vibrating system, in which the coil springs form a border between the output and input sides, so that an inertia on the output side is larger than that in other prior art. Consequently, the resonance rotation speed can be lower than an idling rotation speed so that damping performance is improved. The structure, in which the flywheel and the damper mechanism are combined as described above, provides a flywheel assembly and/or a flywheel damper.

When the flywheel assembly described above is supplied with torque variations from the engine, the springs in the damper mechanism are compressed in the rotating direction so that the torque vibrations are absorbed and damped. A power transmission system of a vehicle causes unwanted noises and vibrations such as gear collision noises of a drive system and muffled noises during driving. For reducing such noises and vibrations, it is necessary to lower torsional rigidity in an acceleration/deceleration torque range so that a torsional resonance frequency of the drive system may be lower than a service speed range of the engine. To lower the torsional rigidity in the damper mechanism, a torsion angle of an elastic member may be increased and/or a plurality of elastic members may be arranged to operate in series.

As the rigidity of the elastic member is lowered, such a situation may occur in which a rotation speed in a low speed range, e.g., lower than 500 rpm passes through a resonance point when starting or stopping the engine. This may cause excessively large torque vibrations that can result in the breaking of the damper mechanism. Alternatively, large noises and vibrations may occur. For overcoming the above problems, a lock mechanism has been used such that members on the opposite sides of the damper mechanism are locked together in a low speed range, and are released from each other to enable the operation of the damper mechanism in a high-speed range. This lock mechanism is generally formed of a lock member and an elastic member. The lock member is biased by the elastic member toward a locking position for preventing rotation of a member on the output side of the damper mechanism with respect to a member on the crankshaft side, and is moved by a centrifugal force to a releasing position for releasing the locked state. However, this lock mechanism complicates the structure, and increases the number of parts.

Additionally, when the flywheel assembly described above is supplied with torque variations from the engine, as mentioned, the springs in the damper mechanism are compressed in the rotating direction so that the torque variations are absorbed and damped. The damper mechanism has a frictional resistance generating mechanism formed of a plurality of members, and sliding occurs in the frictional resistance generating mechanism to generate a predetermined hysteresis torque when the springs are compressed. Thereby, the torsional vibrations are rapidly damped.

However, the frictional resistance generating mechanism is formed of a plurality of plates and friction members, and also has members supporting axially opposite sides of these members. Accordingly, the frictional resistance generating mechanism also requires many parts and a complicated structure as a whole.

Vibrations of vehicles include idling noises or rattling noises, driving noises or acceleration and deceleration rattling noises and muffled noises and tip-in/tip-out or low frequency vibrations.

The idling noises are rattling noises, which are generated from a transmission when a clutch pedal is released after shifting a gear position to neutral, e.g., during a stop at a traffic light. These noises are due to the fact that engine torque is low and varies to a large extent in response to engine combustion when an engine speed is in or near an idling range. In the idling range, tooth collisions occur between an input gear and a counter gear of the transmission.

The tip-in/tip-out or low frequency vibrations or large longitudinal vibrations of a vehicle body, which occurs when a driver rapidly depresses or releases a gas pedal. If a power transmission system has a low rigidity, the torque transmitted to the tires is reversibly transmitted from the tires to the power transmission system. Thus, this reaction causes excessive torque to be applied to the tires so that large longitudinal vibrations transitionally occur to vibrate the vehicle body longitudinally to a large extent.

The idling noises are significantly affected by torsion characteristics of a damper mechanism at and around a zero torque, and can be effectively prevented by reducing torsional rigidity at the zero torque. Conversely, for reducing the longitudinal vibrations of the tip-in/tip-out, torsion characteristics of the damper mechanism must be solid.

For overcoming the above problems, a damper mechanism has been provided such that uses two kinds of spring members for providing characteristics having two stages are used. In this mechanism, the torsional rigidity and a hysteresis torque are kept low in the first stage (low torsion angle region) of the torsion characteristics. This is effective in preventing noises during idling. Since the torsional rigidity and the hysteresis torque are kept high in the second stage (high torsion angle range) of the torsion characteristics, the longitudinal vibrations of tip-in/tip-out can be sufficiently damped.

Further, a damper mechanism has been known that can effectively absorb minute torsional vibrations by not operating a frictional resistance generating mechanism when the minute torsional vibrations are applied, e.g., due to combustion variations of the engine in the second stage of the torsion characteristics.

In the structure for deactivating the frictional resistance generating mechanism in response to minute vibrations, it is necessary to ensure a predetermined angular gap in the rotating direction between a spring member of a high rigidity in a compressed state, and the frictional resistance generating mechanism. The angle of this gap in the rotating direction takes an extremely small value, e.g., from about 0.2° to about 1.0°. This angular gap is maintained, e.g., between a pin and an edge of an aperture or a recess formed in a plate for passing the pin therethrough. This complicates a structure, and requires a difficult assembly operation for ensuring the angular space.

Moreover, a conventional damper mechanism is formed of an input member on the crankshaft side, an output member on the flywheel side, and a plurality of elastic members. The members on the input and output sides are plate members, and are provided with windows for accommodating the elastic members. The window is an aperture axially penetrating the member, and is configured to transmit a torque by supporting the circumferential ends in the rotating direction of the elastic member, and to support radially opposite ends and axially opposite sides of the elastic member.

However, various members of the damper mechanism have windows, which connect the spaces on the axially opposite sides to each other. Therefore, these windows are prone to transmit vibrational noises as well as sliding noises and others of the elastic members from the engine side to the transmission side.

In view of the above, there exists a need for clutch device that overcomes the above-mentioned problems in the prior art. This invention addresses this need in the prior art as well as other needs, which will become apparent to those skilled in the art from this disclosure.

SUMMARY OF THE INVENTION

An object of the present invention is to provide a clutch device having a flywheel coupled to a shaft of a transmission via a clutch disk assembly or the like, and particularly to suppress resonance vibrations in a low speed range by a simple structure.

An alternate object of the present invention is to provide a flywheel assembly coupled to a shaft of a transmission via a clutch disk assembly and others, and particularly to simplify a whole structure by reducing the number of parts of a frictional resistance generating mechanism.

Still another object of the invention is to ensure easily an angular gap in the rotating direction to prevent a frictional resistance generating mechanism from generating a high hysteresis torque in a predetermined torsion angle range.

An object of the invention is to provide a flywheel assembly, which can suppress transmission of noises from an engine side to a transmission side for silencing.

According to a first aspect of the present invention, a clutch device capable of releasably transmitting a torque from a crankshaft of an engine to a transmission, includes a flywheel, a damper mechanism, a clutch disk assembly, a release device, and a relative rotation suppressing mechanism. The flywheel is axially movable within a predetermined range with respect to the crankshaft, and has a friction surface on a side opposite the engine. The damper mechanism elastically couples the flywheel and the crankshaft together in a rotating direction. The clutch disk assembly has a frictional coupling portion neighboring the friction surface of the flywheel. The clutch cover assembly is attached to the flywheel, and elastically biases the frictional coupling portion toward the friction surface of the flywheel. The release device releases a biasing force from the frictional coupling portion by applying a load directed axially toward the engine to the clutch cover assembly. The relative rotation suppressing mechanism couples the flywheel to a member on the crankshaft side when the clutch cover assembly receives the load directed axially toward the engine.

In this clutch device, when the release device applies a load to the clutch cover assembly to release the clutch, the relative rotation suppressing mechanism utilizes this load to couple the flywheel to a member on the crankshaft side (e.g., the crankshaft itself or another member fixed to the crankshaft). This suppresses the operation of the damper mechanism in the clutch releasing operation, and suppresses resonance in a low speed range at the time of starting or stopping the engine. In the above structure, the damper mechanism is locked by using the load applied from the release device in the clutch release operation. Therefore, the structure can be simplified relative to the prior art.

According to a second aspect of the present invention, the clutch device of the first aspect further has a feature such that the relative rotation suppressing mechanism axially presses the flywheel from a transmission side against the crankshaft side by a load applied by the release device to the clutch cover assembly in an axial direction toward the engine.

According to the clutch device of the above aspect, the relative rotation suppressing mechanism axially presses the flywheel against the member on the crankshaft side from the transmission side when the release device applies the load directed axially toward the engine to the clutch cover assembly. In this structure, the damper mechanism is locked by using the load applied from the release device in the clutch releasing operation. This simplifies the overall structure of the clutch device.

According to a third aspect of the present invention, the clutch device of the second aspect further has a feature such that the relative rotation suppressing mechanism further has a lock member fixed to the crankshaft and functions as a member on the crankshaft side.

According to a fourth aspect of the present invention, the clutch device of the third aspect further has a feature such that the lock member has a disk-like form.

According to a fifth aspect of the present invention, the clutch device of the fourth aspect further has a feature such that the relative rotation suppressing mechanism further has a friction member arranged between the flywheel and the lock member.

In this clutch device, the relative rotation suppressing mechanism axially presses the flywheel against the member on the crankshaft side from the transmission side when the release device applies the load directed axially toward the engine to the clutch cover assembly. In this structure, the friction member is held between the flywheel and the member on the crankshaft to couple them frictionally together in the rotating direction. This friction member functions as a member to damp a shock, which is caused when the flywheel is coupled to the member on the crankshaft side, and also contributes to early stopping of the relative rotation in the coupling operation. The friction member may be fixed to either the flywheel or the lock member.

According to a sixth aspect of the present invention, the clutch device of any one of the first to fifth aspects further has a feature such that the flywheel is formed of a flywheel body provided with the friction surface and a contact member arranged on the engine side of the flywheel body. The clutch device further has a frictional resistance generating mechanism. The frictional resistance generating mechanism is held on the flywheel body by the contact member, and generates a predetermined frictional resistance when relative rotation occurs between the crankshaft and the flywheel.

In this clutch device, since the contact member has a function of holding the frictional resistance generating mechanism on the flywheel body side, the number of parts can be small, and the structure can be simple relative to that of the prior art.

According to a seventh aspect of the present invention, the clutch device of the sixth aspect further has a feature such that the contact member has a fixed portion fixed to the flywheel body and a contact portion being in contact with the member on the crankshaft side. The frictional resistance generating mechanism is arranged between the contact portion and the flywheel body.

In this clutch device, since the frictional resistance generating mechanism is arranged between the contact portion of the contact member of the flywheel and the flywheel body, the required space of the structure can be reduced.

According to an eighth aspect of the present invention, the clutch device of the sixth or seventh aspect further has a feature such that the contact member further has a supporting portion supporting the elastic member in the rotating direction.

In this clutch device, since the contact member has the supporting member, the number of parts can be small, and the structure can be simplified relative to the prior art.

According to a ninth aspect of the present invention, a flywheel assembly coupled to a crankshaft of an engine and releasably engaged with a frictional coupling portion of a clutch disk assembly, includes a flywheel, an elastic member, and a frictional resistance generating mechanism. The flywheel has a first friction surface for a clutch arranged on a side remote from an engine side and a second friction surface arranged on the engine side. The elastic member elastically couples the flywheel to the crankshaft in a rotating direction, and is compressed in the rotating direction when relative rotation occurs between the flywheel and the crankshaft. The frictional resistance generating mechanism generates a frictional resistance when relative rotation occurs between the flywheel and the crankshaft. The frictional resistance generating mechanism has a friction member in contact with the second friction surface of the flywheel.

In this flywheel assembly, a torque is transmitted from the crankshaft to the flywheel via the elastic member. When torque variations are transmitted from the engine, the flywheel rotates relatively to the crankshaft to compress the elastic member in the rotating direction. Thereby, the torsional vibrations in the flywheel assembly are absorbed and damped. Since the frictional resistance generating mechanism generates a frictional resistance, the torsional vibrations are rapidly damped.

Since the frictional resistance generating mechanism has the friction member in contact with the second friction surface of the flywheel, the second friction surface of the flywheel functions as a part of the frictional resistance generating mechanism. This reduces the number of parts forming the frictional resistance generating mechanism, and simplifies the structure thereof. Alternatively, the friction member may be fixed to another member or the flywheel, or may be rotatable with respect to both of them.

According to a tenth aspect of the present invention, the flywheel assembly of the ninth aspect further has a feature such that the frictional resistance generating mechanism is arranged to operate in parallel with the elastic member in the rotating direction between the flywheel and the crankshaft.

In this flywheel assembly, the frictional resistance generating mechanism operates in parallel with the elastic member to absorb and damp the torsional vibrations.

According to an eleventh aspect of the present invention, the flywheel assembly of the ninth or tenth aspect further has a feature such that the first and second friction surfaces have annular forms, and the second friction surface has an effective radius larger than that of the first friction surface.

This flywheel assembly can generate a high hysteresis torque because the second friction surface has an effective radius larger than that of the first friction surface.

According to a twelfth aspect of the present invention, a frictional resistance generating mechanism for damping torsional vibrations by generating a frictional resistance when relative rotation occurs between first and second rotary members, includes a first member fixed to the first rotary member and a second member frictionally and relatively rotatably engaged with the second rotary member. The first and second members form a rotating-direction engagement portion for engagement in a rotating direction. The rotating-direction engagement portion ensures a space in the rotating direction allowing relative rotation through a predetermined angular range, and is axially removable and attachable.

In the frictional resistance generating mechanism, when the first and second rotary members rotate relatively to each other, the second member rotates together with the first member via the rotating-direction engagement portion therebetween, and slides with respect to the second rotary member to generate a relatively large hysteresis torque. Thereby, torsional vibrations of a large torsion angle can be rapidly damped. When minute torsional vibrations of a small torsion angle are applied, the first member rotates relatively to the second member through a predetermined angular range owing to the space in the rotating direction of the rotating-direction engagement portion. Thus, the second member does not rotate relatively to the second rotary member, and thus, does not generate a high hysteresis torque. Since the high hysteresis torque is not generated as described above, the minute torsional vibrations are effectively absorbed.

In this frictional resistance generating mechanism, since the rotating-direction engagement portion is axially removable and attachable, the rotating-direction engagement portion can be assembled easily.

According to a thirteenth aspect of the present invention, the frictional resistance generating mechanism of the twelfth aspect further has a feature such that the rotating-direction engagement portion is formed of a first claw of the first member and a second claw of the second member.

According to a fourteenth aspect of the present invention, the frictional resistance generating mechanism of the thirteenth aspect further has a feature such that each of the first and second members is formed of a plate member, and each of the first and second claws extends axially from a main body of the plate member.

According to a fifteenth aspect of the present invention, a flywheel assembly for transmitting a torque from a crankshaft of an engine, includes a flywheel and an elastic member. The flywheel is rotatable with respect to the crankshaft. The elastic member is arranged on an engine side of the flywheel to couple elastically the crankshaft to the flywheel in a rotating direction. The flywheel has a continuous form to isolate spaces on the axially opposite sides from each other.

In this flywheel assembly, the torque is transmitted from the crankshaft to the flywheel via the elastic member. When torque variations are transmitted from the engine, the flywheel rotates relatively to the crankshaft so that the elastic member is compressed in the rotating direction. Thereby, torsional vibrations are absorbed and damped in the flywheel assembly.

In this flywheel assembly, the flywheel has a continuous form to isolate the spaces on the axially opposite sides from each other. This suppresses transmission of noises generated on the engine side of the flywheel to the other side. The structure having the "continuous form to isolate the spaces on the axially opposite sides from each other" represents such a structure that is not provided with an axially penetrating aperture over a region of at least a predetermined area, and thereby substantially impedes axial transmission of sound in this region.

According to a sixteenth aspect of the present invention, the flywheel assembly of the fifteenth aspect further has a feature such that the flywheel has an annular flywheel body and a plate member fixed to the flywheel body and extending radially inward with respect to the flywheel. The plate member has a continuous form isolating spaces on the axially opposite sides from each other.

In this flywheel assembly, since the plate member has the continuous form isolating the spaces on the axially opposite sides from each other, it can suppress transmission of the noises generated on the engine side of the flywheel to the opposite side.

According to a seventeenth aspect of the present invention, the flywheel assembly of the sixteenth aspect further has a feature such that the plate member is provided with an elastic member accommodating portion formed of a concavity opened toward the engine. The elastic member accommodating portion preferably has a continuous form.

In this flywheel assembly, the elastic member is supported on the plate member by the elastic member accommodating portion. Also, the elastic member accommodating portion of the plate member has a continuous form. These structures suppress transmission of the noises generated on the engine side of the flywheel to the opposite side.

According to an eighteenth aspect of the present invention, the flywheel assembly of the sixteenth or seventeenth aspect further has a feature such that the flywheel assembly further includes a support member fixed to the crankshaft. The plate member is provided with a receiving portion formed of a concavity opened toward the engine and receiving an end of the support member. The receiving portion has a continuous form.

In this flywheel assembly, the flywheel is supported on the crankshaft by the support member. Also, the receiving portion has a continuous form. These structures suppress transmission of the noises generated on the engine side of the flywheel to the opposite side.

According to a nineteenth aspect of the present invention, the flywheel assembly of the sixteenth, seventeenth, or eighteenth aspect further has a feature such that the flywheel assembly further includes a disk-like member fixed to the crankshaft. The plate member has a radially outer frictional coupling portion for frictional coupling with the disk-like member and a continuous portion extending continuously from the frictional coupling portion to an inner periphery of the plate member.

In the flywheel assembly, when the frictional coupling portion of the plate member of the flywheel is coupled to the disk-like member, the flywheel stops its rotation relative to the crankshaft, and the elastic member is no longer compressed. Since the plate member has the continuous portion, this suppresses transmission of the noises generated on the engine side of the flywheel to the opposite side.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

(1) Structure

Figure 1:
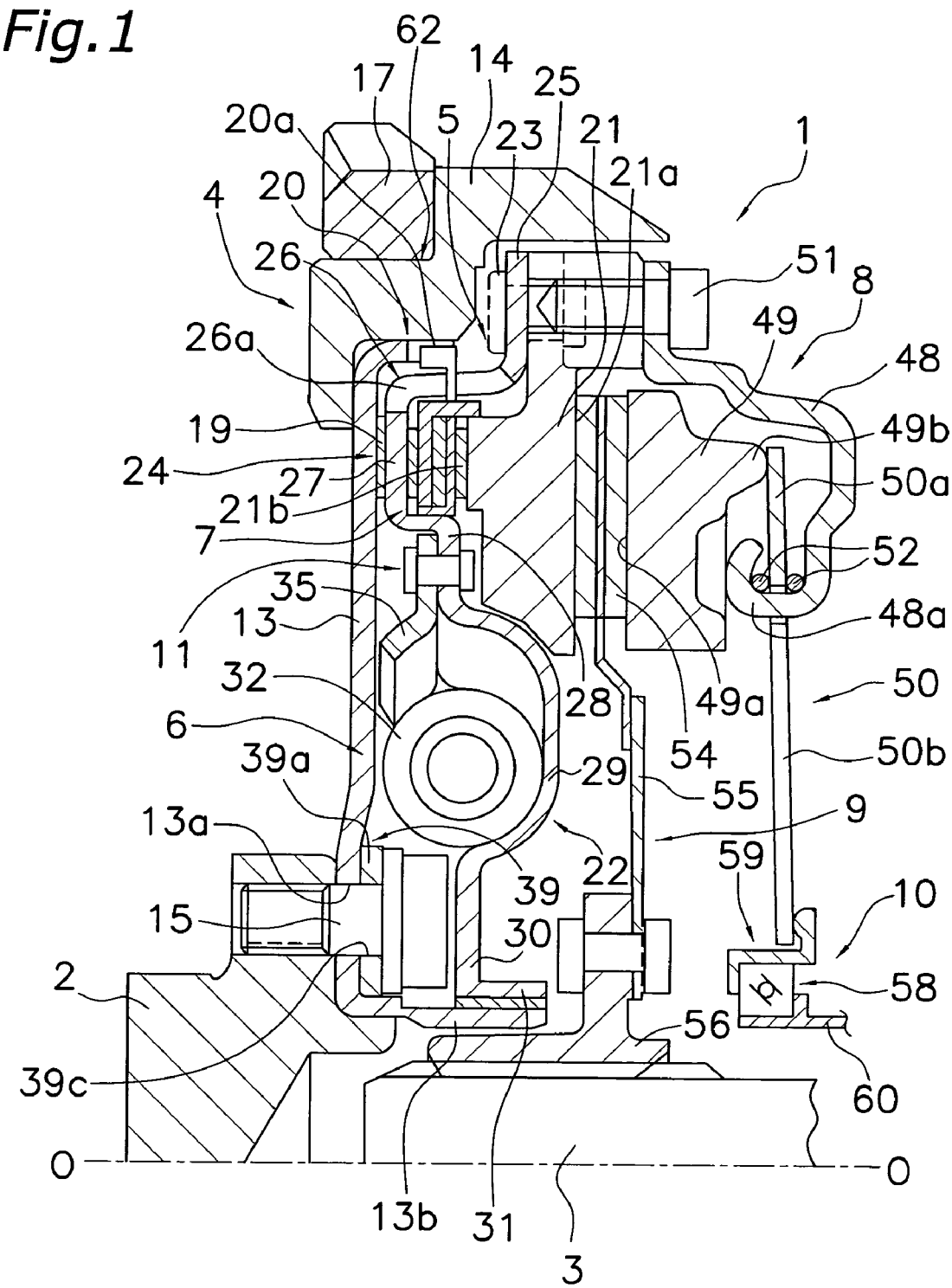
FIG. 1 is a schematic cross-sectional view of a clutch device in accordance with a preferred embodiment of the present invention.
Figure 2:
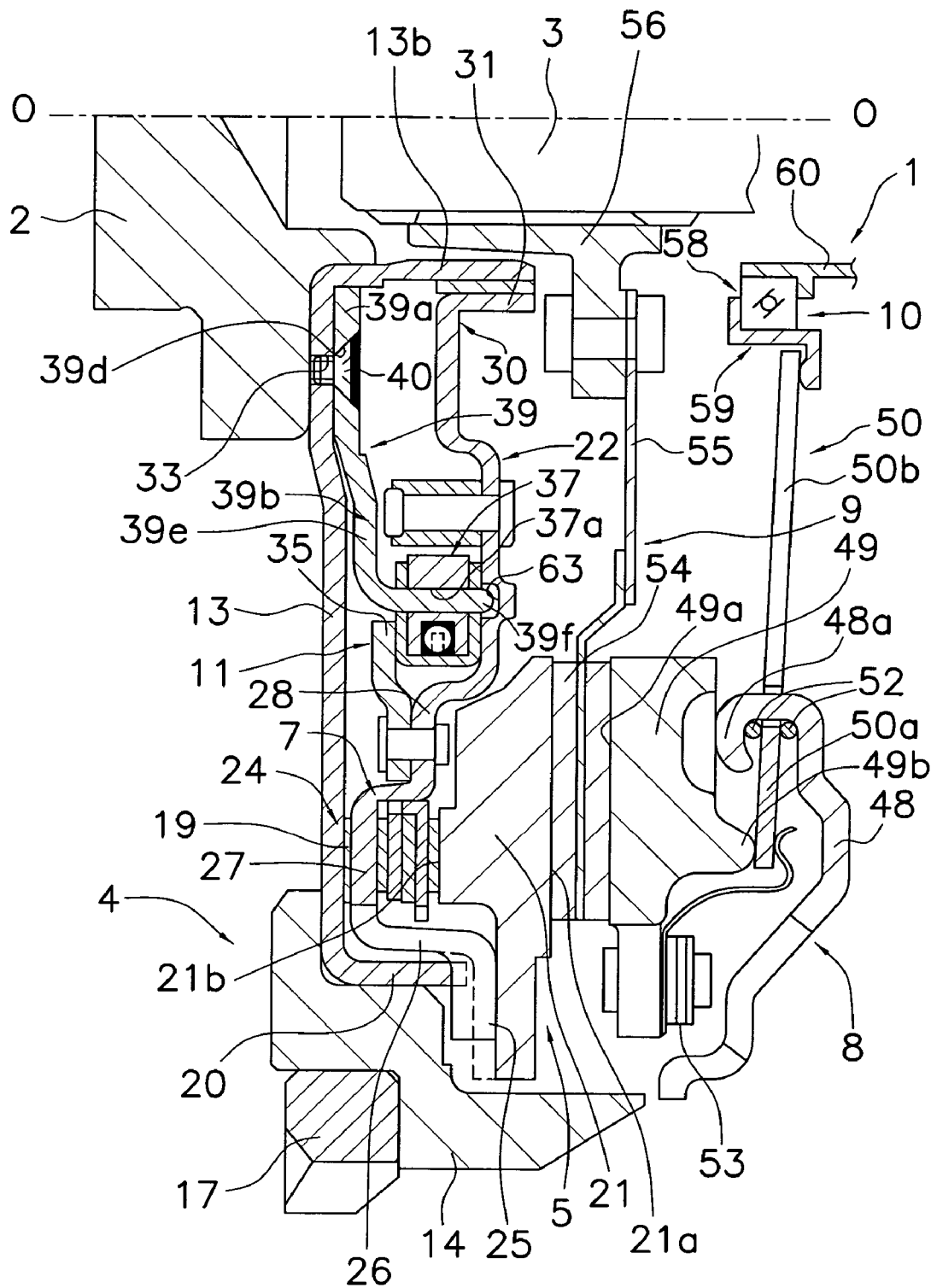
FIG. 2 is an alternate schematic cross-sectional view of the clutch device of FIG. 1.

Referring initially to FIGS. 1 and 2, a clutch device 1 in accordance with a preferred embodiment of the present invention is primarily formed of a first flywheel assembly 4, a second flywheel assembly 5, a clutch cover assembly 8, a clutch disk assembly 9, and a release device 10. The first and second flywheel assemblies 4 and 5 are combined to form a flywheel damper 11 including a damper mechanism 6.

An engine (not shown) is arranged on the left side in FIGS. 1 and 2, and a transmission (not shown) is arranged on the right side. The clutch device 1 is a device that releasably transmits a torque between a crankshaft 2 on the engine side and an input shaft 3 on the transmission side.

The first flywheel assembly 4 is fixed to an end of the crankshaft 2. The first flywheel assembly 4 is a member that ensures a large moment of inertia on the crankshaft side. The first flywheel assembly 4 is primarily formed of a disk-like member 13, an annular member 14, and a support plate 39, which will be described later. The disk-like member 13 has a radially inner end fixed to an end of the crankshaft 2 by a plurality of bolts 15. The disk-like member 13 has bolt insertion apertures 13a in locations respectively corresponding to the bolts 15. Each bolt 15 is preferably axially attached to the crankshaft 2 from the transmission side. The annular member 14 is preferably axially fixed to the radially outer end of the disk-like member 13, and has a relatively thick block-like form. The annular member 14 preferably extends toward the transmission side relative to the disk-like member 13. Portions of the annular member 14, however, preferably contact the radially outer end of the disk-like member 13 at a radially outermost portion and a radially outer engine side portion. The radially outer end of the disk-like member 13 is preferably welded to the annular member 14. Further, a ring gear 17 for an engine starter is fixed to an outer peripheral surface of the annular member 14. The first flywheel assembly 4 may be formed of an integral or unitary member.

Figure 4:
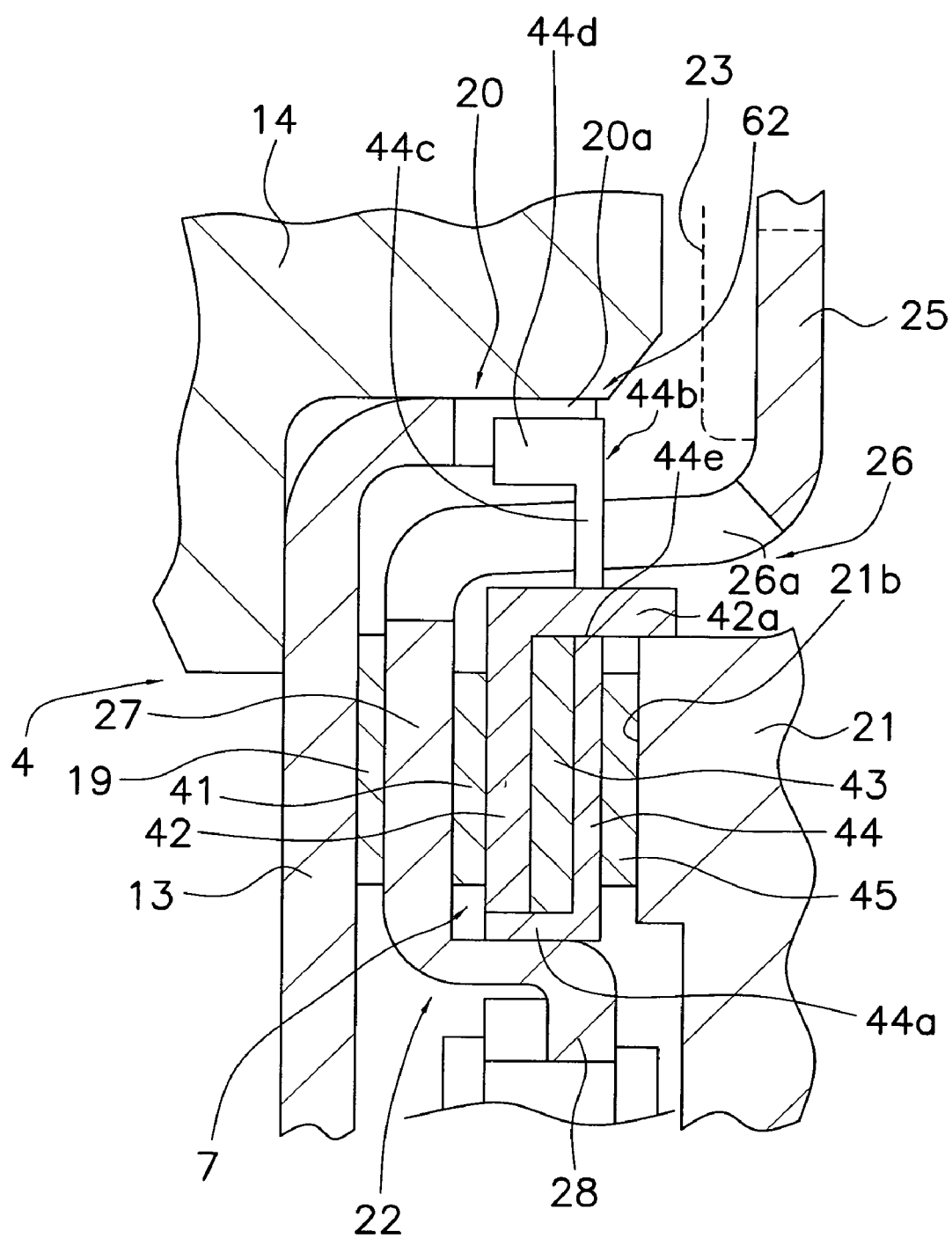
FIG. 4 is an enlarged fragmentary cross-sectional view that particularly illustrates a frictional resistance generating mechanism of the clutch device of FIG. 1.
Figure 6:
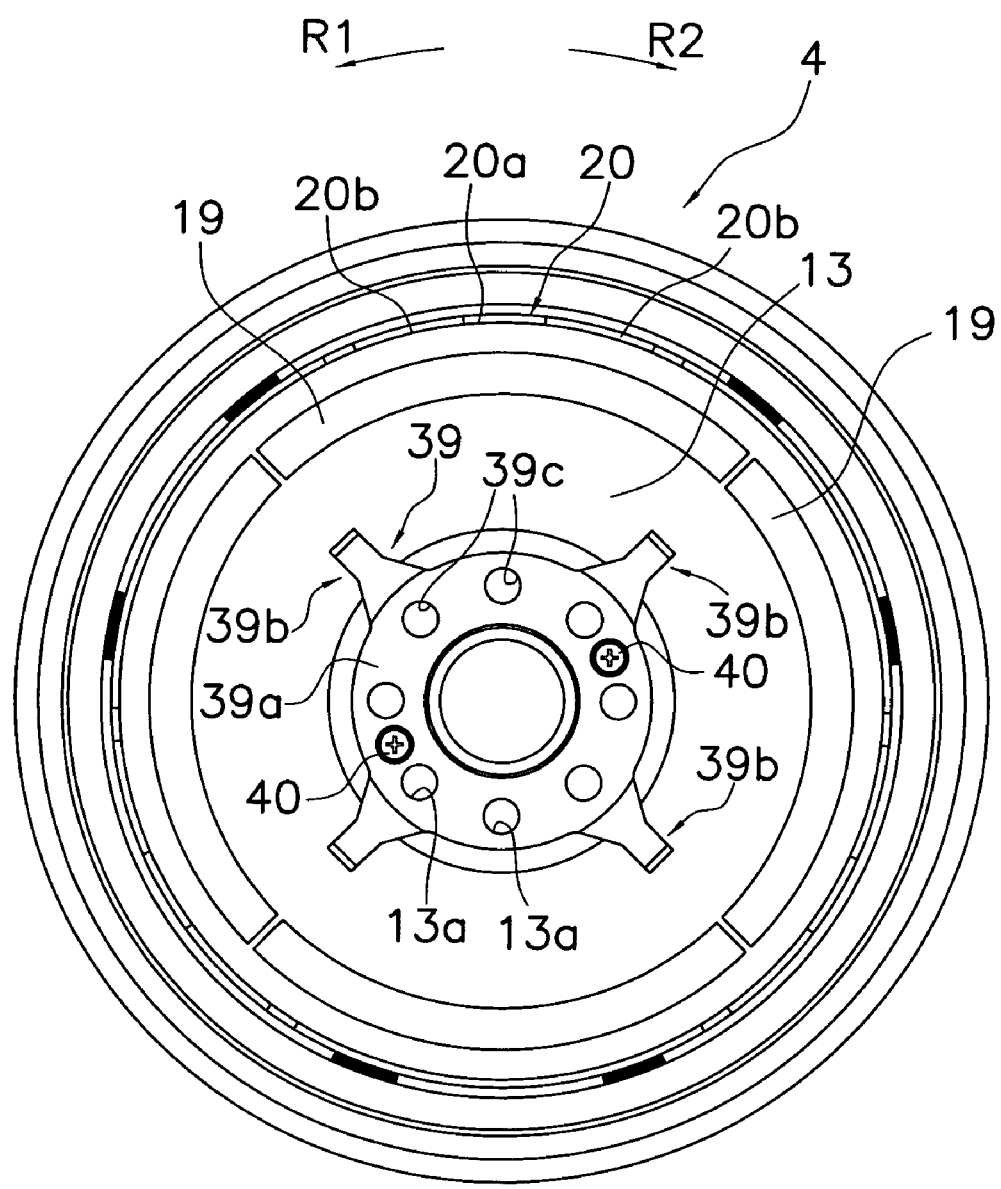
FIG. 6 is an elevational view of a first flywheel of the clutch device of FIG. 1
Figure 7:
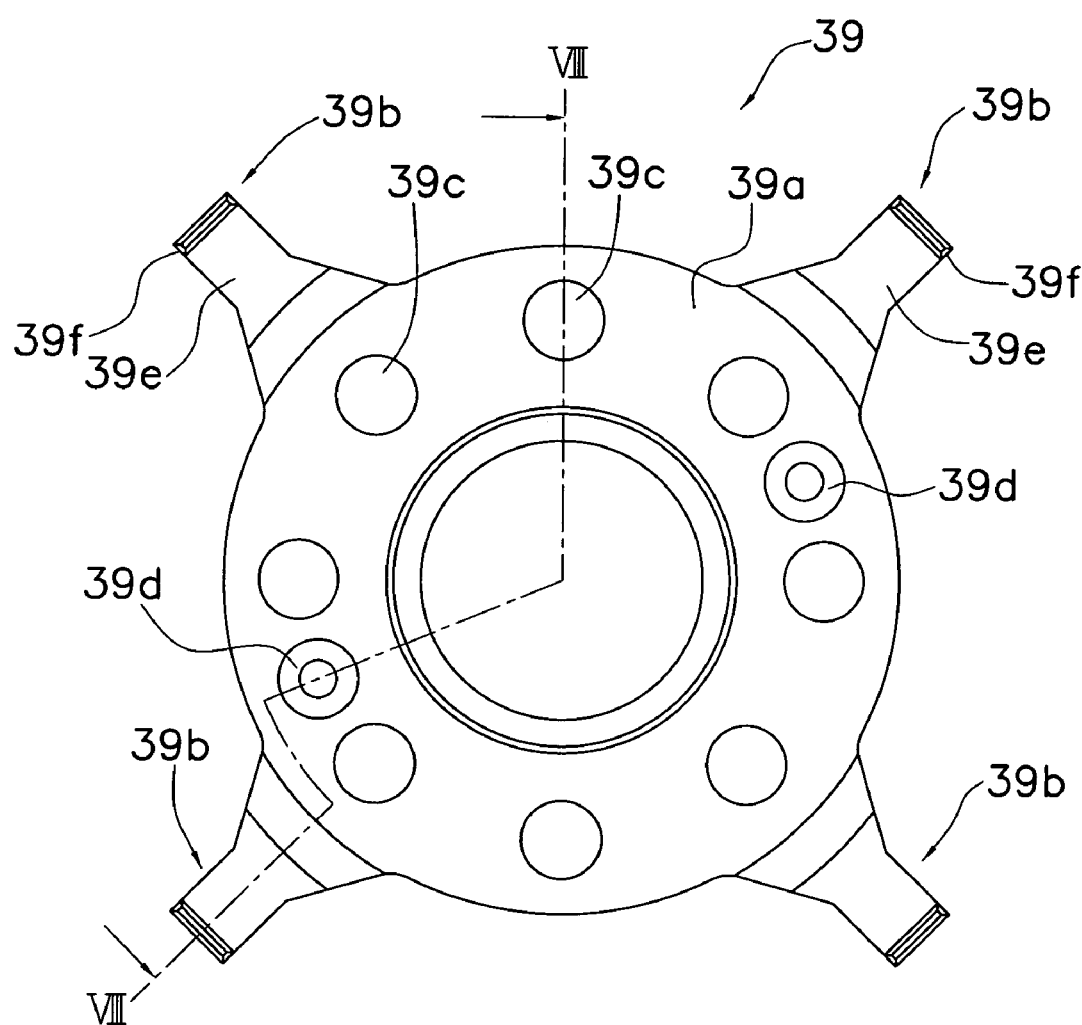
FIG. 7 is an elevational view of a support plate for the first flywheel.
Figure 8:
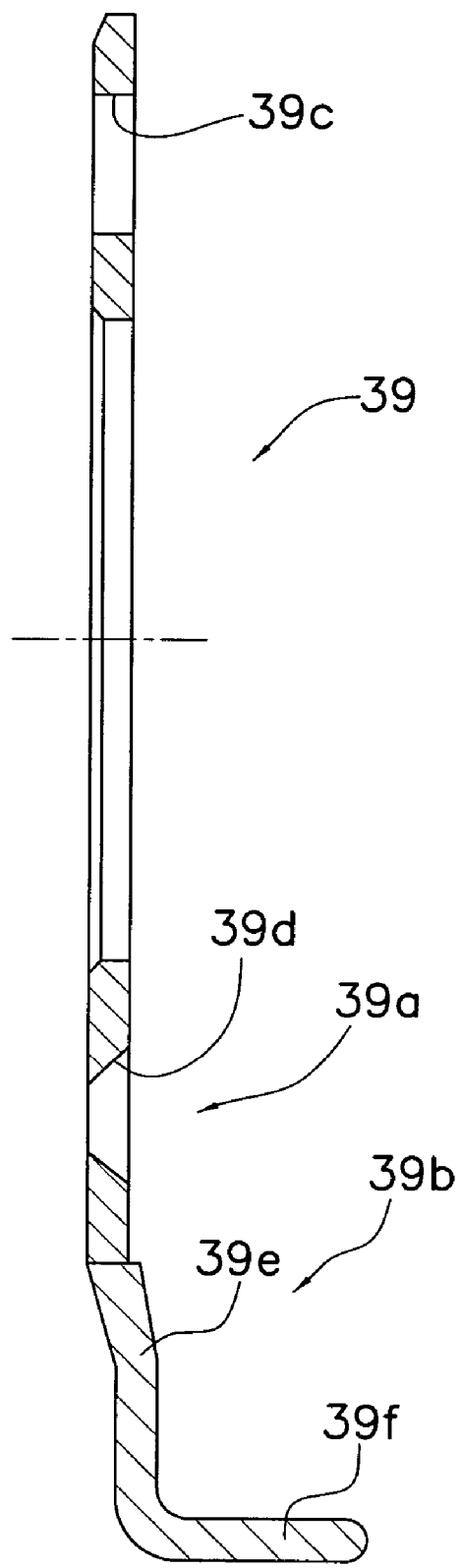
FIG. 8 is a cross-sectional view of the support plate taken along line segments and arc labelled VIII—VIII in FIG. 7.
Figure 9:
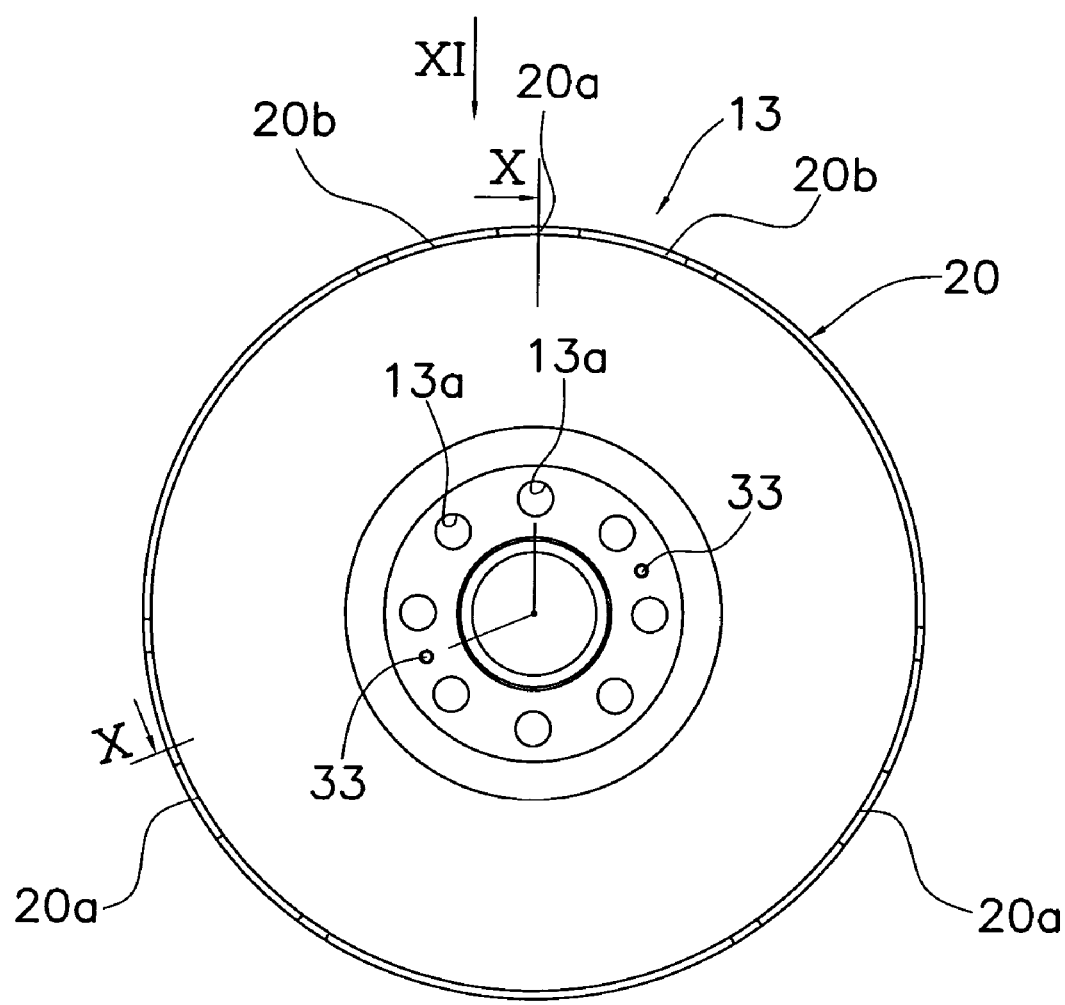
FIG. 9 is an elevational view of a disk-like member of the clutch device of FIG. 1.
Figure 10:
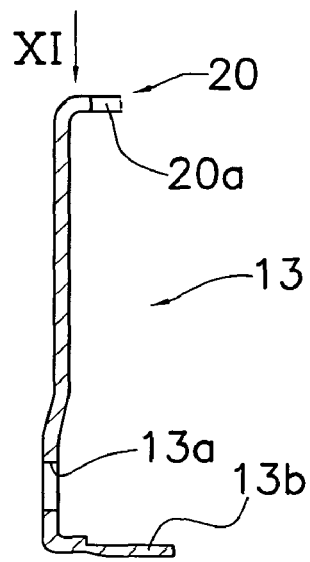
FIG. 10 is a cross-sectional view of the disk-like member taken along angle X—X in FIG. 9.
Figure 10:
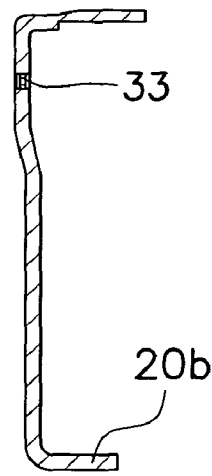

A structure of the radially outer portion of the disk-like member 13 will now be described in greater detail. As shown in FIG. 4, a radially outer portion of the disk-like member 13 has a flat form, and a friction member 19 is affixed to its radial surface on the transmission side. As shown in FIG. 6, the friction member 19 is formed of a plurality of arc-shaped members, and has an annular form as a whole. Referring again to FIGS. 1 and 2, in a relative rotation suppressing mechanism 24, the friction member 19 functions as a member for damping shock, which is caused when the first and second flywheel assemblies 4 and 5 are coupled together. The friction member 19 also serves to stop the relative rotation early in the coupling operation. Alternatively, the friction member 19 may be fixed to a disk-like plate 22.

Figure 11:
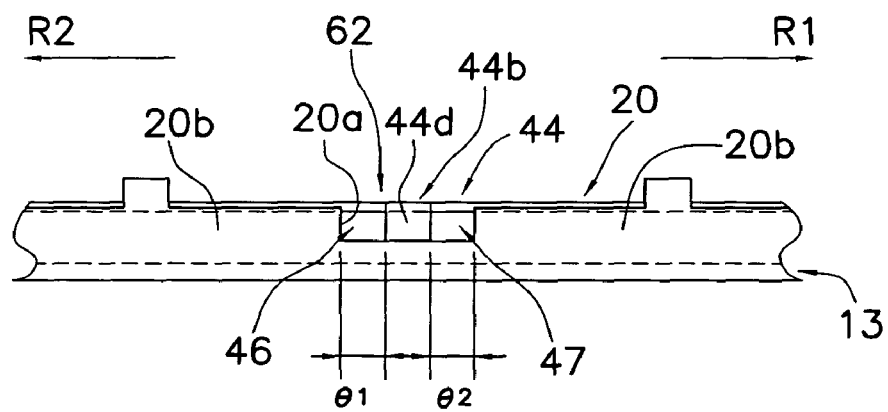
FIG. 11 is a fragmentary plan view of the disk-like member viewed in a direction along ray XI in FIGS. 9 and 10.
Figure 12:
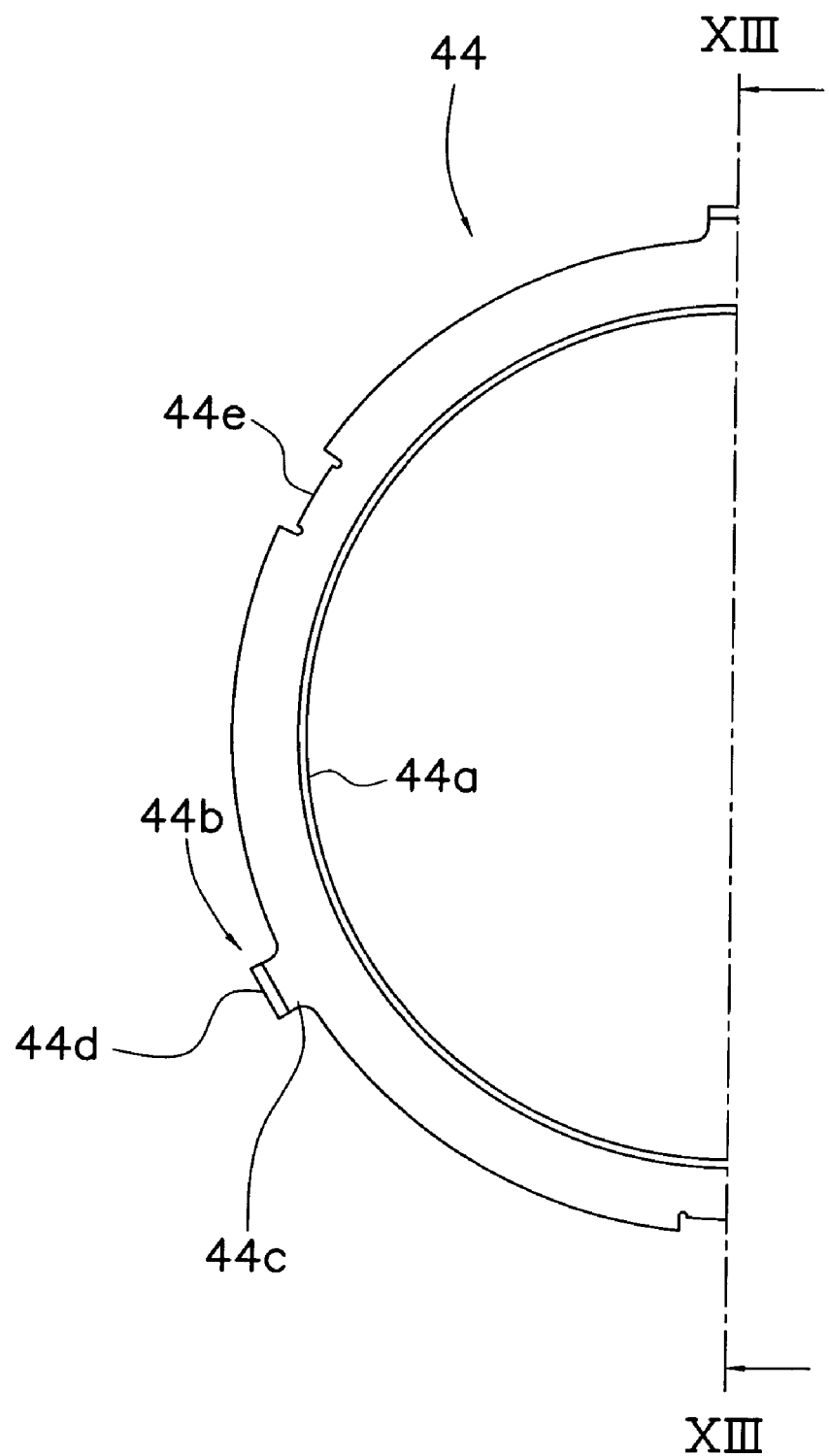
FIG. 12 is a fragmentary elevational view of a second friction plate of the clutch device of FIG. 1.
Figure 13:
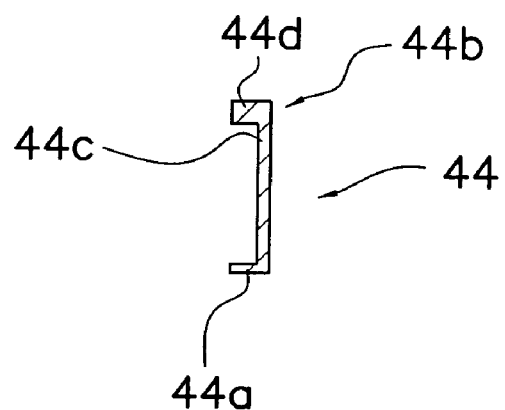
FIG. 13 is a cross-sectional view of the second friction plate taken along line XIII—XIII in FIG. 12.
Figure 13:

As shown in FIGS. 1 and 2, the disk-like member 13 is provided at its outer periphery with a cylindrical portion 20 extending axially toward the transmission. The cylindrical portion 20 is supported on the inner peripheral surface of the annular member 14, and is provided at its end with a plurality of recesses 20a. As seen in FIG. 11, each recess 20a has a predetermined angular length in the rotating direction, and functions as a part of a rotating-direction engaging portion 62 as described later. Each recess 20a is defined in the rotating direction between the opposite portions, which can be considered as axial claws 20b of the cylindrical portion 20.

As seen in FIGS. 1 and 2, the second flywheel assembly 5 is primarily formed of a flywheel 21 with a friction surface, and the disk-like plate 22. The flywheel 21 with the friction surface has an annular and disk-like form, and is axially located on the transmission side with respect to the outer peripheral portion of the first flywheel assembly 4. The flywheel 21 with the friction surface is provided on its transmission side with a first friction surface 21a. The first friction surface 21a is an annular and flat surface, and can be coupled to the clutch disk assembly 9, which will be described later. The flywheel 21 with the friction surface is further provided on its engine side with a second friction surface 21b. The second friction surface 21b is an annular and flat surface, and functions as a frictional sliding surface of a frictional resistance generating mechanism 7, which will be described later. As compared with the first friction surface 21a, the second friction surface 21b preferably has a slightly smaller outer diameter and a significantly larger inner diameter. Accordingly, the second friction surface 21b has a larger effective radius than the first friction surface 21a. The second friction surface 21b is axially opposed to the friction member 19.

Figure 5:
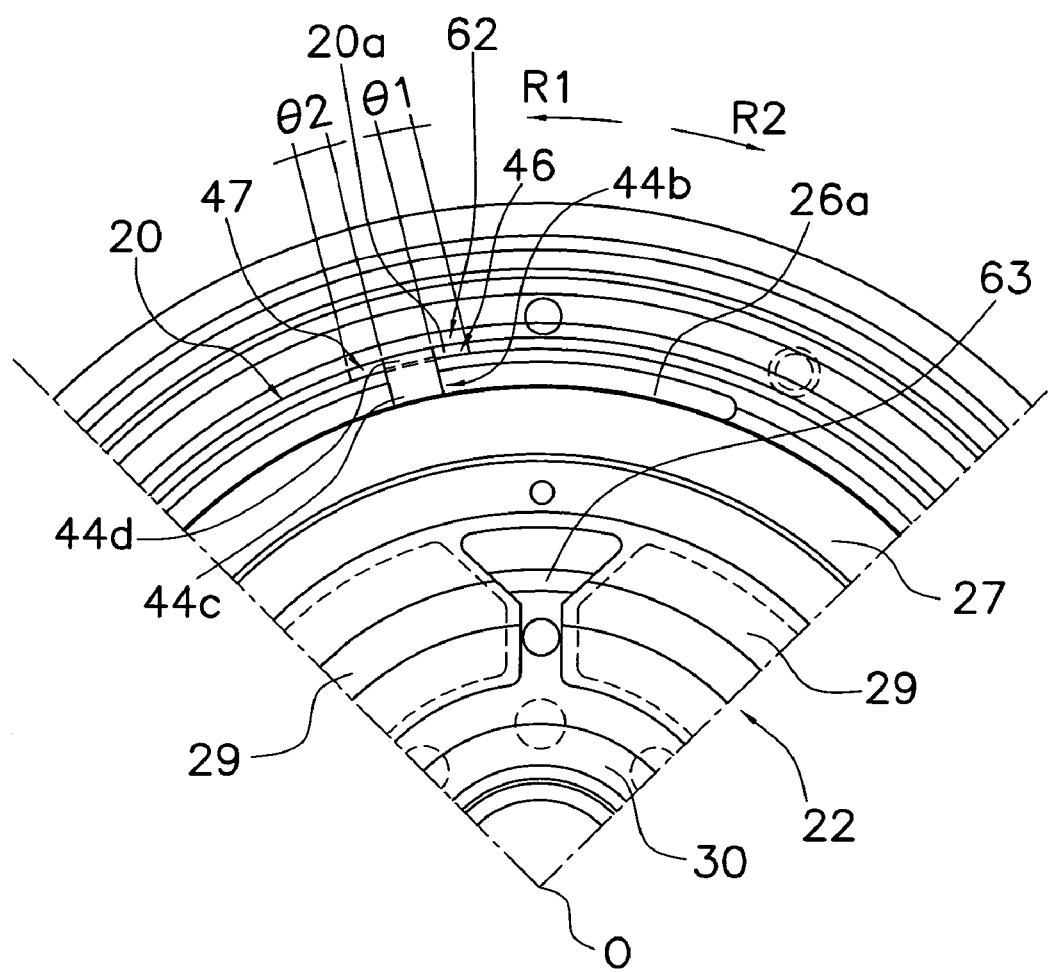
FIG. 5 is an enlarged fragmentary elevational view that particularly illustrates the frictional resistance generating mechanism of the clutch device of FIG. 1.

Description will now be given on the disk-like plate 22. The disk-like plate 22 is arranged axially between the first flywheel assembly 4 and the flywheel 21 having the friction surface. The disk-like plate 22 has a radially outer portion fixed to a radially outer portion of the flywheel 21 having the friction surface by a plurality of rivets 23, and functions as a member rotating together with the flywheel 21 having the friction surface. More specifically, the disk-like plate 22 is formed of a radially outer fixing portion 25, a cylindrical portion 26, a contact portion 27, a coupling portion 28, a spring support portion 29, a radially inner portion 30, and a radially inner cylindrical portion 31, which are aligned radially in this order. The radially outer fixing portion 25 is flat and is in axial contact with the engine side of the radially outer portion of the flywheel 21 having the friction surface. The radially outer fixing portion 25 is fixed to the flywheel 21 by the rivets 23 already described. The cylindrical portion 26 extends axially toward the engine from the inner periphery of the radially outer fixing portion 25, and is arranged on the radially inner side of the cylindrical portion 20 of the disk-like member 13. The cylindrical portion 26 is provided with a plurality of recesses 26a. As shown in FIG. 5, each recess 26a is formed corresponding to the recess 20a in the cylindrical portion 20, but is angularly longer in the rotating direction than the recess 20a. In the rotating direction, therefore, the opposite ends of each recess 26a are located outside the opposite ends of the corresponding recess 20a. Referring to FIGS. 1 and 5, the contact portion 27 has a circular and flat form, and corresponds to the friction member 19. The contact portion 27 is axially opposed to the second friction surface 21b of the flywheel 21 having the friction surface with a space therebetween, and various members of the frictional resistance generating mechanism 7, to be described later, are arranged in this space. The frictional resistance generating mechanism 7 is arranged between the contact portion 27 of the disk-like plate 22 of the second flywheel assembly 5 and the flywheel 21 having the friction surface, so that the space required by the structure can be small. The coupling portion 28 is a flat portion located axially on the transmission side with respect to the contact portion 27, and a spring support plate 35 is fixed thereto as described later. The spring support portion 29 is a portion for accommodating and supporting coil springs 32 of the damper mechanism 6. Since the disk-like plate 22 having the contact portion 27 also has the spring support portion 29, this structure allows a reduction in the number of parts, and simplifies the structure relative to the prior art. The radially inner cylindrical portion 31 is radially supported on a radially inner cylindrical portion 13b of the disk-like member 13, and is rotatable thereto.

Description will now be given on the damper mechanism 6 with reference initially to FIGS. 1 and 2. The damper mechanism 6 is a mechanism that elastically couples the crankshaft 2 to the flywheel 21 having the friction surface in the rotating direction. The damper mechanism 6 is formed of an elastic coupling mechanism including a plurality of coil springs 32 and the frictional resistance generating mechanism 7.

Each coil spring 32 is preferably formed of a combination of large and small springs. Each coil spring 32 is accommodated in each of the spring support portions 29, and its radially opposite sides, relative to the rotation direction of the clutch device 1, are supported by the spring support portion 29. The spring support portion 29 also axially supports the transmission side of the coil spring 32, and further supports the opposite sides in the rotating direction. The spring support plate 35 is fixed to the coupling portion 28 of the disk-like plate 22 by rivets 34. The spring support plate 35 is arranged corresponding to the spring support portion 29, and axially supports the engine side of the radially outer portion of the each coil spring 32.

Figure 3:
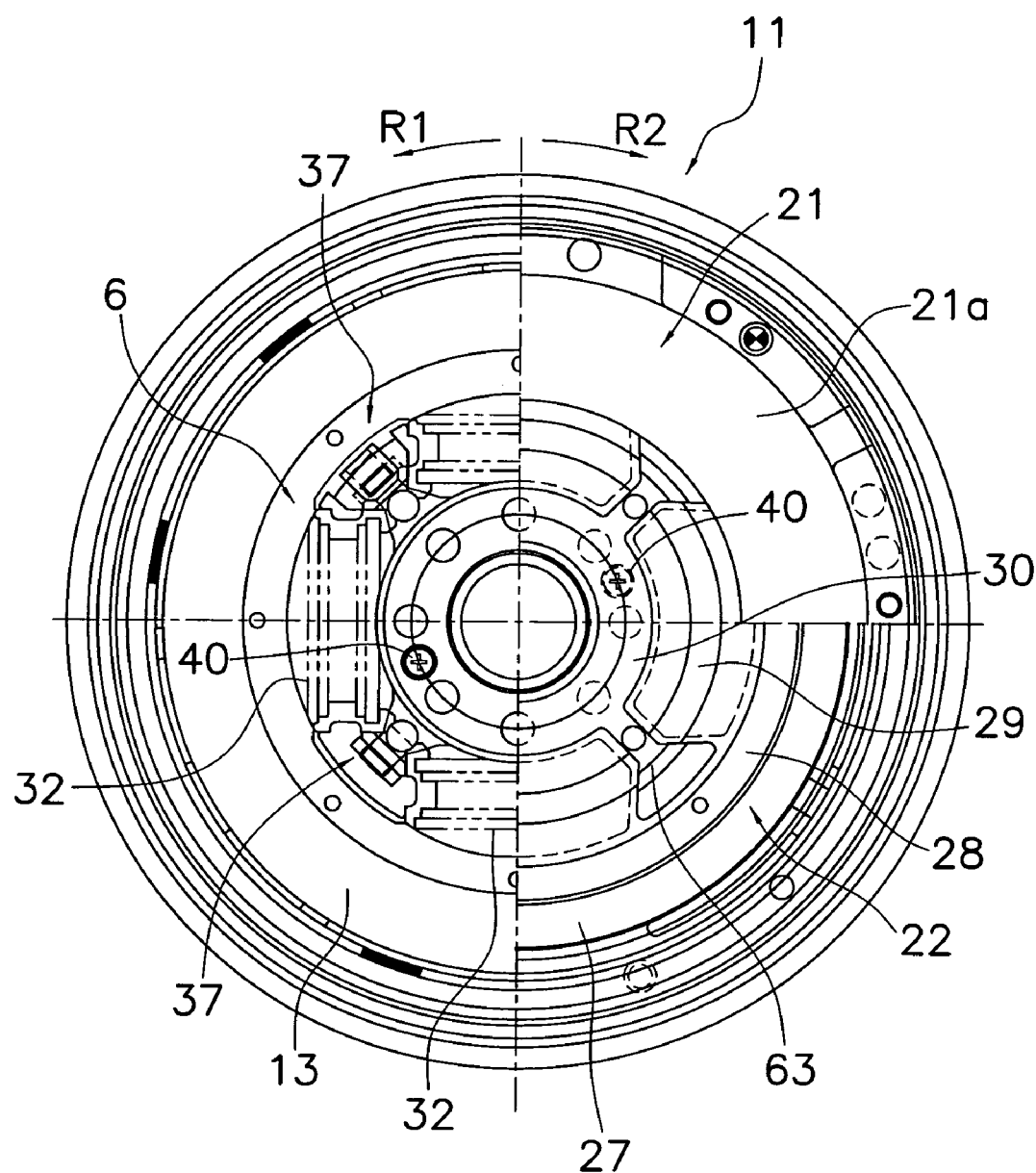
FIG. 3 is an elevational view of the clutch device of FIG. 1.

The structure of the elastic coupling mechanism will now be described further in detail. As seen in FIGS. 2 and 3, a spring rotating-direction support mechanism 37 is arranged circumferentially (i.e., in the rotating direction) between the neighboring coil springs 32, and is movable in the rotating direction while being held axially between the disk-like plate 22 and the spring support plate 35. Each spring rotating-direction support mechanism 37 substantially has a block form, and has an axial through aperture 37a.

The support plate 39 is fixed to the surface of the radially inner portion of the disk-like member 13 on the transmission side. The support plate 39 is formed of a disk-like portion 39a and a plurality of radial protrusions 39b extending radially outward from the outer periphery of the disk-like portion 39a. Each protrusion 39b is provided at diametrally opposite two positions with circular apertures 39d each defined by a surface that tapers in the axial direction. A bolt 40 is fitted into each circular aperture 39d. The bolt 40 is engaged with a screw aperture 33 in the disk-like member 13 to fix the support plate 39 to the disk-like member 13. As seen in FIG. 1, the disk-like portion 39a is provided with a plurality of circular apertures 39c corresponding to the bolt through holes 13a of the disk-like member 13, into which shanks of the bolts 15 are fitted, respectively. Referring again to FIG. 2, the protrusion 39b is formed of a radial extension 39e extending substantially along the disk-like member 13, and an axial extension 39f extending axially toward the transmission from the end of the extension 39e. The axial extension 39f of the protrusion 39b is inserted into the aperture 37a in each spring rotating-direction support mechanism 37 from the engine side, and can be engaged therewith. As described above, the spring rotating-direction support mechanism 37 and the support plate 39 function as members on the torque input side in the elastic coupling mechanism.

Referring now to FIGS. 1 and 2, the frictional resistance generating mechanism 7 operates in a rotating direction space between the crankshaft 2 and the flywheel 21 having the friction surface. Further, the frictional resistance generating mechanism 7 functions in parallel with the coil spring 32 to generate a predetermined hysteresis torque when relative rotation occurs between the crankshaft 2 and the flywheel 21 with the friction surface. As seen in FIG. 4, the frictional resistance generating mechanism 7 is formed of a plurality of washers, which are arranged between the second friction surface 21b of the flywheel 21 having the friction surface and the contact portion 27 of the disk-like plate 22, and are in contact with each other. The frictional resistance generating mechanism 7 has a first friction washer 41, a first friction plate 42, a conical spring 43, a second friction plate 44, and a second friction washer 45, which are axially aligned in this order from the position near the contact portion 27 toward the flywheel 21 with the friction surface. The first and second friction washers 41 and 45 are preferably made of a material having a high friction coefficient, and other members are preferably made of steel. As described above, the disk-like plate 22 has a function of holding the frictional resistance generating mechanism 7 on the side of the flywheel 21 with the friction surface. This arrangement reduces the number of parts, and simplifies the structure.

The first friction washer 41 is located between the contact portion 27 and the first friction plate 42. In this embodiment, the first friction washer 41 is fixed to the first friction plate 42. Alternatively, it may be fixed to the contact portion 27, or may be fixed to neither of them. The first friction plate 42 is located between the first friction washer 41 and the conical spring 43. The first friction plate 42 is provided at its outer periphery with a plurality of protrusions 42a extending axially toward the transmission. A radially inner surface of the end of each protrusion 42a is preferably in contact with the outer peripheral surface of the flywheel 21 having the friction surface, and is radially supported thereby. The conical spring 43 has a conical form when it is not compressed. In FIG. 4, the conical spring 43 is compressed between the first and second friction plates 42 and 44 into a flat form so that it applies an elastic force to the members on the opposite sides. The second friction plate 44 is located between the conical spring 43 and the second friction washer 45. The second friction plate 44 is provided at its inner periphery with an inner cylindrical portion 44a extending axially toward the engine. The inner peripheral surface of the radially inner cylindrical portion 44a is radially supported by the disk-like plate 22. The outer peripheral surface of the inner cylindrical portion 44a is in contact with the inner peripheral surfaces of the first friction plate 42 and the conical spring 43 to support them radially. The second friction plate 44 is provided at its outer periphery with recesses 44e, through which the foregoing protrusions 42a extend for engagement, respectively. Owing to this engagement, the first friction plate 42 is axially movable but rotationally unmovable with respect to the second friction plate 44. The second friction washer 45 is located between the second friction plate 44 and the second friction surface 21b of the flywheel 21 having the friction surface. In this embodiment, the second friction washer 45 is fixed to the second friction plate 44. However, it may be fixed to the flywheel 21 having the friction surface, or may be fixed to neither of them.

The second friction plate 44 is provided at its outer periphery with a plurality of protrusions 44b. The protrusions 44b are formed corresponding to the recesses 26a, respectively, and each are formed of a protruding portion 44c extending radially outward and a claw 44d extending axially toward the engine from the end of the protruding portion 44c. The protruding portion 44c extends radially through the recess 26a. The claw 44d is located radially outside the cylindrical portion 26, and extends axially into the recess 20a in the cylindrical portion 20 of the disk-like member 13 from the transmission side. The claw 44d and the recess 20a form a rotating-direction engaging portion 62 located between the disk-like member 13 and the second friction plate 44.

Figure 15:
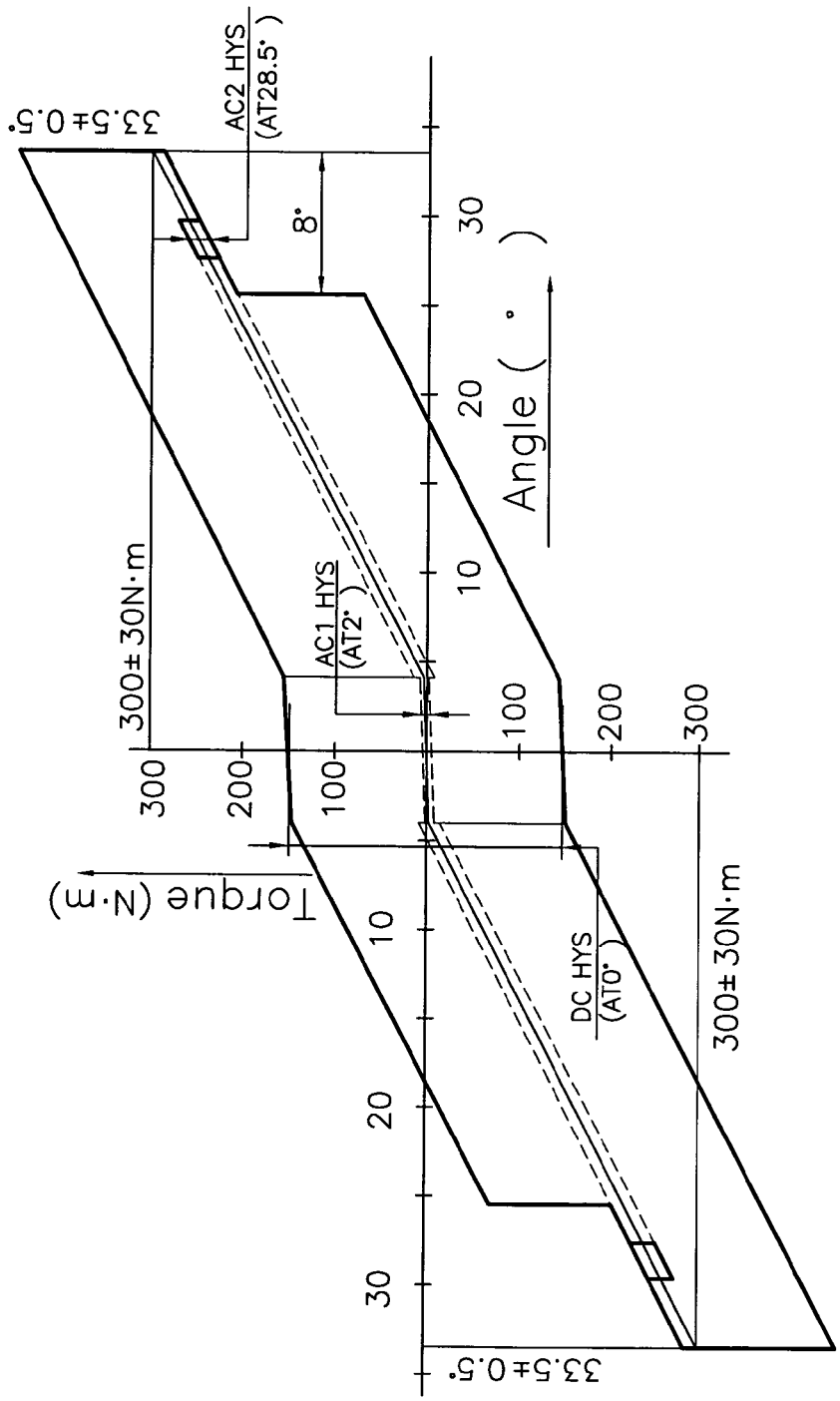
FIG. 15 is a view of a graph that illustrates torsion characteristics of the damper mechanism.

As seen in FIG. 5, in the rotating-direction engaging portion 62, the claw 44d has a circumferential width (i.e., width in the rotating direction) smaller than that of the recess 20a, and therefore can move a predetermined angle within the recess 20a. This means that the second friction plate 44 is movable through a predetermined angular range with respect to the disk-like member 13. This predetermined angle and angular range correspond to minute torsional vibrations caused by variations in engine combustion, and have magnitudes to absorb effectively such vibrations without causing a high hysteresis torque. More specifically, a circumferential gap 46 of a torsion angle θ1 is maintained on the forward side in the rotating direction R1 with respect to the claw 44d, and a circumferential space 47 of a torsion angle θ2 is maintained on the forward side in the rotating direction R2 of the cylindrical portion 20. Consequently, a total of the torsion angles θ1 and θ2 is equal to the predetermined angle, which is the angle the second friction plate 44 can rotate relatively to the disk-like member 13. As seen in FIG. 15, in this embodiment, the total torsion angle is preferably equal to 8 degrees, and is preferably in a range slightly exceeding the damper operation angle, which is produced by minute torsional vibrations due to the variations in engine combustion.

Referring again to FIG. 5, from another viewpoint, the minute circumferential spaces 46 and 47 may be considered to be formed by the claw 20b of the disk-like member 13 and the claw 44d of the second friction plate 44. Each of the claws 20b and 44d is formed by axially bending a radially outer portion of the disk-like member 13 and the second friction plate 44. Thus, each of the claws 20b and 44d has a simple structure.

Referring now to FIGS. 1 and 5, the minute circumferential spaces 46 and 47, which are formed by the recesses 20a in the disk-like member 13 and the claws 44d of the second friction plate 44 as described above, can be provided merely by locating the first and second flywheel assemblies 4 and 5 close to each other in the rotating direction, and fitting the claws 44d into the recesses 20a, respectively. This facilitates the assembling operation.

Since the minute circumferential spaces 46 and 47 formed by the recesses 20a in the disk-like member 13 and the claws 44d of the second friction plate 44 are formed between the radially outer portions of the first and second flywheel assemblies 4 and 5, the radially inner portion of each of the flywheel assemblies 4 and 5 can be designed with high flexibility.

Referring to FIGS. 1 and 2, the clutch cover assembly 8 is a mechanism that elastically biases a friction facing 54 of the clutch disk assembly 9 toward the first friction surface 21a of the flywheel 21 having the friction surface. The clutch cover assembly 8 is primarily formed of a clutch cover 48, a pressure plate 49, and a diaphragm spring 50.

The clutch cover 48 is a disk-like member preferably made of sheet metal, and has a radially outer portion fixed to the flywheel 21 having the friction surface by bolts 51.

The pressure plate 49 is preferably made of, e.g., cast iron. The pressure plate 49 is arranged radially inside the clutch cover 48, and is axially located on the transmission side with respect to the flywheel 21 having the friction surface. The pressure plate 49 has a pressing surface 49a opposed to the first friction surface 21a of the flywheel 21 having the friction surface. The pressure plate 49 is provided on its surface remote from the pressing surface 49a with a plurality of arc-shaped protruding portions 49b protruding toward the transmission. The pressure plate 49 is unrotatably coupled to the clutch cover 48 with a plurality of arc-shaped strap plates 53 allowing axial movement. In the clutch engaged state, the strap plates 53 applies a load to the pressure plate 49 to move it away from the flywheel 21 having the friction surface.

The diaphragm spring 50 is preferably a disk-like member arranged between the pressure plate 49 and the clutch cover 48, and is formed of an annular elastic portion 50a and a plurality of lever portions 50b extending radially inward from the elastic portion 50a. The elastic portion 50a is in axial contact with the transmission side of the protruding portion 49b of the pressure plate 49.

The clutch cover 48 is provided at its inner periphery with a plurality of tabs 48a, which extend axially toward the engine, and then are bent radially outward. Each tab 48a extends toward the pressure plate 49 through an aperture in the diaphragm spring 50. Two wire rings 52 supported by the tabs 48a support the axially opposite sides of the radially inner portion of the elastic portion 50a of the diaphragm spring 50. In this state, the elastic portion 50a is axially compressed to apply an axial elastic force to the pressure plate 49 and the clutch cover 48.

The clutch disk assembly 9 has a friction facing 54 arranged between the first friction surface 21a of the flywheel 21 having the friction surface and the pressing surface 49a of the pressure plate 49. The friction facing 54 is fixed to a hub 56 via an annular disk-like plate 55. The hub 56 has a central aperture for spline-engagement with the transmission input shaft 3.

The release device 10 is a mechanism for driving the diaphragm spring 50 of the clutch cover assembly 8 to perform the clutch releasing operation on the clutch disk assembly 9. The release device 10 is primarily formed of a release bearing 58 and a hydraulic cylinder device (not shown). The release bearing 58 is primarily formed of inner and outer races as well as a plurality of rolling elements arranged therebetween. The release bearing 58 can bear radial and thrust loads. A cylindrical retainer 59 is attached to an outer race of release bearing 58. The retainer 59 has a cylindrical portion in contact with the outer peripheral surface of the outer race, a first flange, which extends radially inward from an axial end on the engine side of the cylindrical portion and is in contact with the surface of the engine side of the outer race, and a second flange extending radially outward from an end on the transmission side of the cylindrical portion. The second flange is provided with an annular support portion, which is in axial contact with a portion on the transmission side of the radially inner end of each lever portion 50b of the diaphragm spring 50.

A hydraulic cylinder device is primarily formed of a hydraulic chamber forming member and a piston 60. The hydraulic forming member and the cylindrical piston 60 arranged radially inside the member define a hydraulic chamber between them. The hydraulic chamber can be supplied with a hydraulic pressure from a hydraulic circuit. The piston 60 has a substantially cylindrical form, and has a flange, which is in axial contact with the inner race of the release bearing 58 from the transmission side. When the hydraulic circuit supplies hydraulic fluid into the hydraulic chamber, the piston 60 axially moves the release bearing 58 toward the engine.

As already described, each of the first and second flywheel assemblies 4 and 5 provides an assembly independent of the other, and is axially removably attached. More specifically, as seen in FIGS. 1 and 4, the first and second flywheel assemblies 4 and 5 are engaged with each other owing to engagement between the cylindrical portion 20 and the second friction plate 44, engagement between the disk-like member 13 and the contact portion 27, engagement between the spring support plate 35 and the spring rotating-direction support mechanism 37, and engagement between the radially inner cylindrical portion 13b and the radially inner cylindrical portion 31, which are provided at positions located radially inward in this order, respectively. These assemblies 4 and 5 are axially movable through a predetermined range with respect to each other. More specifically, the second flywheel assembly 5 is axially movable with respect to the first flywheel assembly 4 between a position, where the contact portion 27 is slightly spaced from the friction member 19, and a position, where the contact portion 27 is in contact with the friction member 19.

(2) Operation (2-1) Torque Transmission

Referring to FIGS. 1 and 2, in this clutch device 1, a torque is supplied from the crankshaft 2 of the engine to the flywheel damper 11, and is transmitted from the first flywheel assembly 4 to the second flywheel assembly 5 via the damper mechanism 6. In the damper mechanism 6, the torque is transmitted through the support plate 39, the spring rotating-direction support mechanism 37, the coil spring 32, and the disk-like plate 22 in this order. Further, the torque is transmitted from the flywheel damper 11 to the clutch disk assembly 9 in the clutch engaged state, and is finally provided to the input shaft 3.

When the clutch device 1 receives combustion variations from the engine, the damper mechanism 6 operates to rotate the support plate 39 and the spring rotating-direction support mechanism 37 relatively to the disk-like plate 22 so that the plurality of coil springs 32 are compressed therebetween. Further, the frictional resistance generating mechanism 7 generates a predetermined hysteresis torque. Through the foregoing operations, the torsional vibrations are absorbed and damped.

More specifically, each coil spring 32 is compressed between the spring rotating-direction support mechanism 37 and a circumferential end of the spring support portion 29 of the disk-like plate 22. In the frictional resistance generating mechanism 7, the first and second friction plates 42 and 44 rotate together with the disk-like member 13, and rotate relatively to the disk-like plate 22 and the flywheel 21 having the friction surface. Consequently, as seen in FIG. 4 the first friction washer 41 slides between the contact portion 27 and the first friction plate 42, and the second friction washer 45 slides between the second friction plate 44 and the flywheel 21 having the friction surface. Since two friction surfaces reliably operate, a relatively large hysteresis torque occurs. In the above structure, the second friction surface 21b of the flywheel 21 having the friction surface provides the friction surface of the frictional resistance generating mechanism 7. This reduces the number of parts, and simplifies the structure relative to the prior art.

Figure 14:
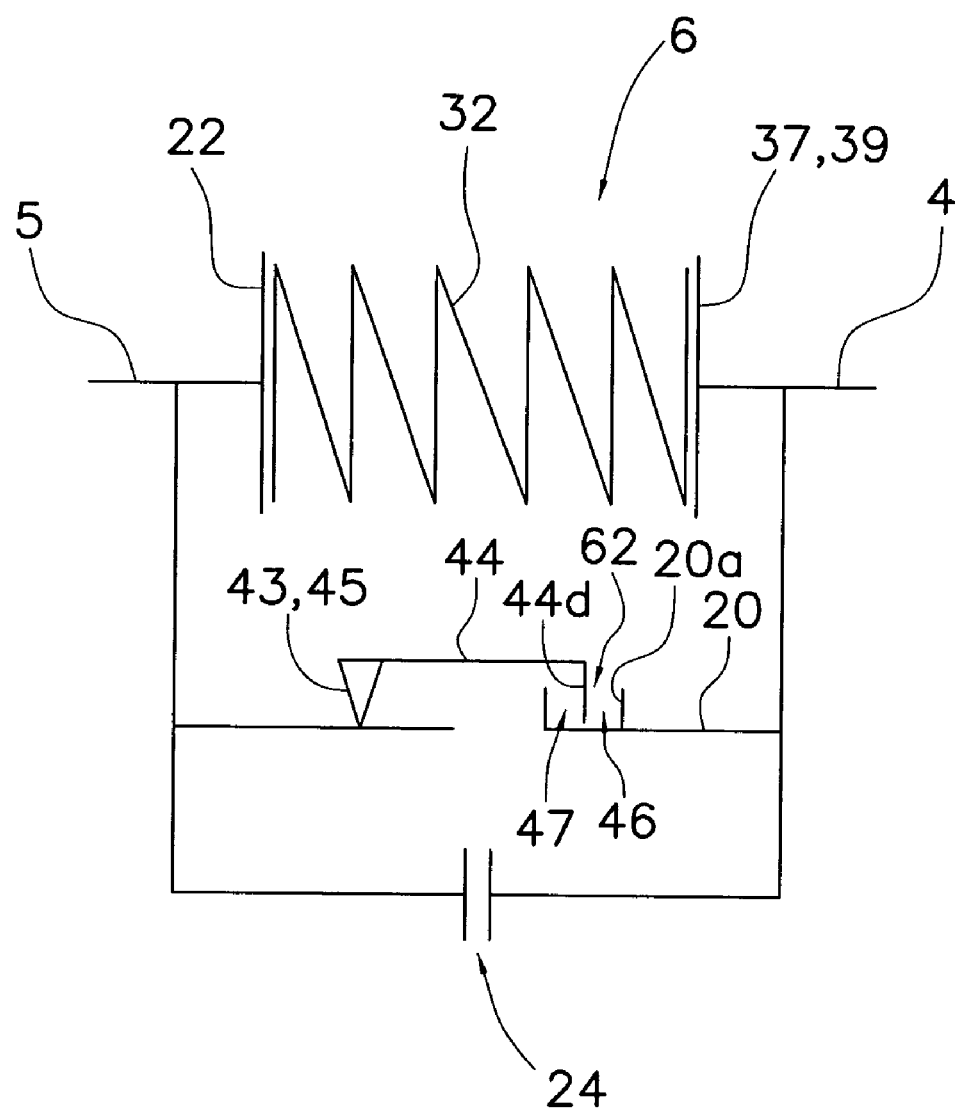
FIG. 14 is a view of a mechanical circuit diagram of a damper mechanism of the clutch device of FIG. 1.

When the minute torsional vibrations caused by the variations in combustion of the engine are supplied to the clutch device 1, the damper mechanism 6 operates in a manner, which will now be described with reference to a mechanical circuit diagram of FIG. 14 and a torsion characteristic diagram of FIG. 15. When minute torsional vibrations are supplied to the clutch device 1, in which the coil springs 32 of the damper mechanism 6 are in the compressed state, the second friction plate 44 of the frictional resistance generating mechanism 7 rotates relatively to the disk-like member 13 through a range corresponding to the minute circumferential space 46 and 47 between the edge of the recess 20a in the cylindrical portion 20 of the disk-like member 13 and the claw 44d. Thus, the first and second friction plates 42 and 44 rotate together with the contact portion 27 and the flywheel 21 having the friction surface as well as the first and second friction washers 41 and 45 interposed therebetween. Consequently, the minute torsional vibrations do not cause a high hysteresis torque. More specifically, at "AC2 HYS" in the torsion characteristic diagram of FIG. 15, the coil spring 32 operates, but the frictional resistance generating mechanism 7 does not cause the sliding. Thus, in the predetermined torsion angle range, a hysteresis torque much smaller than the ordinary hysteresis torque is produced. This small hysteresis torque is preferably about ⅒ of the hysteresis torque in the whole range. Since the structure includes the minute rotating-direction space 46 and 47, which prevents operation of the frictional resistance generating mechanism 7 within the predetermined angular range in the torsion angle characteristics, the vibration and noise levels can be significantly reduced.

(2-2) Clutch Engaging and Releasing Operations

Referring to FIGS. 1 and 2, when the hydraulic circuit (not shown) supplies the hydraulic fluid into the hydraulic chamber of the hydraulic cylinder, the piston 60 moves axially toward the engine. Thereby, the release bearing 58 axially moves the radially inner end of the diaphragm spring 50 toward the engine. Consequently, the elastic portion 50a of the diaphragm spring 50 is spaced from the pressure plate 49. Thereby, the pressure plate 49 biased by the strap plates 53 moves away from the friction facing 54 of the clutch disk assembly 9 so that the clutch is released.

In the clutch release operation, the release bearing 58 applies an axial load directed toward the engine to the clutch cover assembly 8, and this load axially biases and moves the second flywheel assembly 5 toward the engine. Thereby, the contact portion 27 of the disk-like plate 22 in the relative rotation suppressing mechanism 24 is pressed against the disk-like member 13, and is frictionally engaged therewith. Thus, the second flywheel assembly 5 becomes unrotatable with respect to the first flywheel assembly 4. In other words, the second flywheel assembly 5 is locked with respect to the crankshaft 2 so that the damper mechanism 6 does not operate. Accordingly, when the rotation speed passes through the resonance point in a low speed range (e.g., from 0 to 500 rpm) during starting or stopping the engine, it is possible to suppress the breakage as well as noises and vibrations, which may be caused by the resonance by releasing the clutch.

In this operation, since the damper mechanism 6 is locked by using the load applied from the release device 10 in the clutch releasing operation, the structure can be simple. In particular, since the relative rotation suppressing mechanism 24 is formed of the members with simple structures such as the disk-like member 13 and the disk-like plate 22, a special structure is not required.

(3) Other Operations and Effects

The disk-like plate 22 is preferably an integral or unitary disk-like member, and achieves a plurality of structures and functions as described below.

(3-1) The contact portion 27 forms a portion of the relative rotation suppressing mechanism 24.

(3-2) The contact portion 27 holds the frictional resistance generating mechanism 7 on the flywheel 21 having the friction surface, and provides the friction surface of the frictional resistance generating mechanism 7.

(3-3) The spring support portion 29 supports the coil springs 32 in the rotating direction, and supports together with the spring support plate 35 to support the coil springs 32 for preventing disengagement.

(3-4) The radially inner cylindrical portion 31 radially positions the flywheel 21 having the friction surface with respect to the crankshaft 2.

Owing to the combination of the two or more of the foregoing structures, the parts can be reduced in number, and the whole structure can be simplified relative to the prior art.

(4) Sound Insulation Effect by Flywheel

As described above, the second flywheel assembly 5 is primarily formed of the flywheel 21 with the friction surface and the disk-like plate 22, and this structure suppresses axial transmission of noises, which is generated on the engine side with respect to the second flywheel assembly 5, to the transmission side.

More specifically, the second flywheel assembly 5 has the continuous form to isolate substantially the spaces on the axially opposite sides from each other. This structure suppresses axial transmission of noises, which is generated on the engine side of the second flywheel assembly 5, to the opposite side. The structure having the "continuous form for isolating the spaces on the axially opposite sides from each other" represents such a structure that is not provided with an axially penetrating aperture or the like over a region of at least a predetermined area, and thereby substantially impedes axial transmission of a sound in this region. The second flywheel assembly has no apertures in a predetermined region.

More specifically, the disk-like plate 22 has a continuous form substantially isolating the spaces on the axially opposite sides from each other. This impedes transmission of noises generated on the engine side of the second flywheel assembly 5 to the axially opposite side.

The spring support portion 29 of the disk-like plate 22 is formed of a concavity prepared by drawing and opened toward the engine, and is not provided with an axially penetrating aperture or the like in contrast to a portion formed by partially cutting and bending a member. Thus, the spring support portion 29 has a continuous form.

The disk-like plate 22 is provided with a receiving portion 63 located corresponding to each axial extension 39*f* of the support plate 39. The receiving portion 63 is formed of a concavity opened axially toward the engine, and has an arc-shaped form extending in the rotating direction. The end of the axial extension 39*f* of the support plate 39 is fitted into this receiving portion 63, and is movable in the rotating direction. According to the above structures, the receiving portion 63 supports the axial extension 39*f* of the support plate 39 to allow movement in the rotating direction while restricting the radial and axial movements. The receiving portion 63 is formed of a concavity prepared by the drawing, and does not have an axially penetrating aperture or the like in contrast to a portion prepared by partially cutting and bending a portion. Thus, the receiving portion 63 has a continuous form.

Further, the disk-like plate 22 forms a continuous portion, which extends from the radially outer contact portion 27 for frictional coupling with the disk-like member 13 to its inner periphery (radially inner cylindrical portion 31), and does not have a portion such as a recess or an aperture. Since the disk-like plate 22 has the continuous portion as described above, this suppresses axial transmission of noises, which is generated on the engine side of the second flywheel assembly 5, to the opposite side.

(4) Other Embodiments

Although the embodiments of the clutch device according to the invention have been described and illustrated, the invention is not restricted to them, and can be variously changed or modified without departing from the scope of the invention.

For example, the clutch cover assembly in the foregoing embodiment is of a push type. However, the invention can be applied to a clutch device including a clutch cover assembly of a pull type.

EFFECTS OF THE INVENTION

In the clutch device according to the invention, when the release device applies a load to the clutch cover assembly for releasing the clutch, the relative rotation suppressing mechanism uses this load to couple the flywheel to the member on the crankshaft side such as the crankshaft itself or another member fixed to the crankshaft. Consequently, the damper mechanism hardly operates in the clutch releasing operation, and the resonance can be suppressed in a low speed region during starting or stopping the engine. In the structure, the damper mechanism is locked by using the load applied from the release device in the clutch releasing operation so that the structure can be simple relative to that of the prior art.

According to this flywheel assembly, since the frictional resistance generating mechanism has a friction member in contact with the second friction surface of the flywheel, the second friction surface of the flywheel functions as a part of the frictional resistance generating mechanism. Therefore, the frictional resistance generating mechanism requires a reduced number of parts, and can provide a simple structure.

According to a frictional resistance generating mechanism of the invention, since the rotating-direction engagement portion is axially removable and attachable, the rotating-direction engagement portion can be assembled easily.

According to the flywheel assembly of the invention, since the flywheel has the continuous form isolating the spaces on the axially opposite sides from each other, this structure suppresses axial transmission of noises generated on the engine side of the flywheel to the opposite side.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application Nos. 2002-256569, 2002-256568, 2002-256567, and 2002-342535. The entire disclosures of Japanese Patent Application Nos. 2002-256569, 2002-256568, 2002-256567, and 2002-342535 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A clutch device for releasably transmitting a torque from a crankshaft of an engine to a transmission, comprising:
- a flywheel being axially movable within a predetermined range with respect to the crankshaft, and having a first friction surface on a side remote from the engine, and a second friction surface on a side facing the engine;
- a damper mechanism elastically coupling said flywheel and said crankshaft together in a rotating direction;
- a clutch disk assembly having a frictional coupling portion neighboring to said first friction surface of said flywheel;
- a clutch cover assembly attached to said flywheel being configured to bias elastically said frictional coupling portion toward said first friction surface of said flywheel;
- a release device releasing a biasing force from said frictional coupling portion by applying a load directed axially toward the engine to said clutch cover assembly; and
- a relative rotation suppressing mechanism coupling said flywheel to a member on the crankshaft side when said clutch cover assembly receives said load directed axially toward the engine.

2. The clutch device according to claim 1, wherein said relative rotation suppressing mechanism axially presses said flywheel from a transmission side to a member on the crankshaft side by a load applied by said release device to said clutch cover assembly in an axial direction toward the engine.

3. The clutch device according to claim 2, wherein said relative rotation suppressing mechanism further has a lock member fixed to said crankshaft and functioning as a member on the crankshaft side.

4. The clutch device according to claim 3, wherein said lock member has a disk shape.

5. The clutch device according to claim 4, wherein said relative rotation suppressing mechanism further has a friction member arranged between said flywheel and said lock member.

6. A clutch device for releasably transmitting a torque from a crankshaft of an engine to a transmission, comprising:
- a flywheel being axially movable within a predetermined range with respect to the crankshaft, and having a friction surface on a side remote from the engine, said flywheel being formed of a flywheel body provided with said friction surface and a contact member arranged on an engine side of said flywheel body;
- a damper mechanism elastically coupling said flywheel and the crankshaft together in a rotating direction;
- a clutch disk assembly having a frictional coupling portion neighboring to said friction surface of said flywheel;
- a clutch cover assembly attached to said flywheel being configured to bias elastically said frictional coupling portion toward said friction surface of said flywheel;
- a release device releasing a biasing force from said frictional coupling portion by applying a load directed axially toward the engine to said clutch cover assembly; and
- a relative rotation suppressing mechanism coupling said flywheel to a member on the crankshaft side when said clutch cover assembly receives said load directed axially toward the engine, said relative rotation suppressing mechanism being configured to press axially said flywheel from a transmission side to a member on the crankshaft side by a load applied by said release device to said clutch cover assembly in an axial direction toward the engine, said clutch device having a frictional resistance generating mechanism held on said flywheel body by said contact member to generate a predetermined frictional resistance when relative rotation occurs between said crankshaft and said flywheel.

7. The clutch device according to claim 6, wherein said contact member has a fixed portion fixed to said flywheel body and a contact portion being in contact with the member on the crankshaft side, and said frictional resistance generating mechanism is arranged between said contact portion and said flywheel body.

8. The clutch device according to claim 6, wherein said contact member further has a supporting portion supporting said elastic member in the rotating direction.

9. A flywheel assembly coupled to a crankshaft of an engine and releasably engaged with a frictional coupling portion of a clutch disk assembly, comprising:
- a flywheel having a first friction surface for a clutch arranged on an transmission side and a second friction surface arranged on an engine side, said second friction surface having a larger inner diameter and a smaller outer diameter than said first friction surface;
- an elastic member elastically coupling said flywheel to the crankshaft in a rotating direction, and being compressed in the rotating direction when relative rotation occurs between said flywheel and the crankshaft, said elastic member being arranged radially inside said first and second friction surfaces of said flywheel; and
- a frictional resistance generating mechanism generating a frictional resistance when relative rotation occurs between said flywheel and said crankshaft, said frictional resistance generating mechanism having a friction member in contact with said second friction surface of said flywheel.

10. The flywheel assembly according to claim 9, wherein said frictional resistance generating mechanism is arranged to operate in parallel with said elastic member in the rotating direction between said flywheel and the crankshaft.

11. The flywheel assembly according to claim 9, wherein said first and second friction surfaces have annular forms, and said second friction surface has a smaller outer diameter and a larger inner diameter than those of said first friction surface.

12. A flywheel assembly for transmitting a torque from a crankshaft of an engine, comprising:
- a plate member having a transmission side and an engine side, said plate member being configured to isolate spaces on sides axially opposite each other, and said plate member having an elastic member accommodating portion formed of a concavity relative to said engine side, said elastic member accommodating portion having a continuous form devoid of an axial aperture;
- a flywheel being rotatable with respect to the crankshaft, said flywheel having an annular flywheel body, said plate member being non-rotatably fixed to said flywheel body and extending radially inward with respect to said flywheel body, said flywheel having a first friction surface remote from the engine and a second friction surface on a side facing the engine, said second friction surface having a larger inner diameter and a smaller outer diameter than said first friction surface; and an elastic member arranged on an engine side of said flywheel in said elastic member accommodating portion to couple elastically said crankshaft to said flywheel in a rotating direction, said flywheel having a form to isolate spaces on sides axially opposite each other.

13. The flywheel assembly according to claim 12 further comprising a support member fixed to said crankshaft, wherein said plate member is provided with a receiving portion formed of said concavity relative to the engine and receiving an end of said support member, and said receiving portion has a continuous form.

14. The flywheel assembly according to claim 12, further comprising, a disk shaped member fixed to said crankshaft, wherein said plate member has a radially outer frictional coupling portion for frictional coupling with said disk shaped member and a continuous portion devoid of an axial aperture extending continuously from said frictional coupling portion to an inner periphery of said plate member.

15. The flywheel assembly according to claim 12, wherein said plate member is fixed to said flywheel by rivets.

16. A clutch device comprising:

a first flywheel assembly being non-rotatably fixed to crankshaft of an engine;

a second flywheel assembly being located on an axial transmission side of said first flywheel assembly;

a flywheel damper having said first and second flywheel assemblies and a damper mechanism;

a clutch disk assembly being located on an axial transmission side of said second flywheel assembly, said clutch disk assembly being releasably contactable with said second flywheel assembly;

a clutch cover assembly elastically biasing said clutch disk assembly toward said second flywheel assembly;

a release device being configured to perform a clutch releasing operation on said clutch disk assembly;

a frictional resistance generating mechanism being located axially between said first and second flywheel assemblies being configured to suppress relative rotation between said first and second flywheel assemblies in a predetermined range of torsion characteristics; and a relative rotation suppressing mechanism being located axially between said first and second flywheel assemblies, said relative rotation suppressing mechanism being configured to prevent said damper mechanism from operating during said clutch releasing operation by fixing said first flywheel assembly to said second flywheel assembly.

* * * * *